(12) United States Patent
Abeyasekera et al.

(10) Patent No.: US 10,590,914 B2
(45) Date of Patent: Mar. 17, 2020

(54) CONTROLLED INRUSH CURRENT FOR CONVERTER-CONNECTED GRID FILTER

(71) Applicant: VESTAS WIND SYSTEMS A/S, Aarhus N (DK)

(72) Inventors: Tusitha Abeyasekera, Aarhus N (DK); Duy Duc Doan, Tilst (DK); Gert Karmisholt Andersen, Hovedgård (DK); Lars Helle, Suldrup (DK); Søren Andersen, Tilst (DK); Tune Pedersen, Hinnerup (DK); John Godsk Nielsen, Hornslet (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 65 days.

(21) Appl. No.: 15/572,256

(22) PCT Filed: Jun. 8, 2016

(86) PCT No.: PCT/DK2016/050170
§ 371 (c)(1),
(2) Date: Nov. 7, 2017

(87) PCT Pub. No.: WO2016/206688
PCT Pub. Date: Dec. 29, 2016

(65) Prior Publication Data
US 2018/0112647 A1 Apr. 26, 2018

(30) Foreign Application Priority Data
Jun. 24, 2015 (DK) .................... 2015 70390

(51) Int. Cl.
*H03K 17/945* (2006.01)
*H03K 17/955* (2006.01)
(Continued)

(52) U.S. Cl.
CPC .......... *F03D 7/0284* (2013.01); *F03D 9/255* (2017.02); *H02H 7/26* (2013.01); *H02H 9/001* (2013.01);
(Continued)

(58) Field of Classification Search
CPC .......... H02H 7/26; H02H 9/001; H02H 7/085; Y02E 10/72; Y02E 10/763; H02J 3/386; F03D 9/255
See application file for complete search history.

(56) References Cited

U.S. PATENT DOCUMENTS

2004/0222640 A1* 11/2004 McKelvey ............. H02J 3/40
290/7
2008/0084070 A1* 4/2008 Teichmann ............. H02J 3/38
290/55
(Continued)

FOREIGN PATENT DOCUMENTS

CN 201846230 U 5/2011
EP 1909371 A2 4/2008
(Continued)

OTHER PUBLICATIONS

International Search Report for Application No. PCT/DK2016/050170 dated Aug. 26, 2016.
Danish Search Report for Application No. PA 2015 70390 dated Jan. 18, 2016.

*Primary Examiner* — Alfonso Perez Borroto
*Assistant Examiner* — Esayas G Yeshaw
(74) *Attorney, Agent, or Firm* — Patterson + Sheridan, LLP

(57) ABSTRACT

A method, converter arrangement, and controller are disclosed for connecting an output of a converter with an electrical grid to control inrush currents into a grid filter assembly connected with the output of the converter, the electrical grid carrying an alternating current (AC) signal
(Continued)

having one or more phases. The method includes determining a voltage of the AC signal and operating, after pre-charging a direct current (DC) link of the converter to a predetermined voltage, the converter using open-loop voltage control to produce an AC output signal that substantially matches the AC signal of the electrical grid. The open-loop voltage control is based on the determined voltage of the AC signal. The method further includes closing, after a predetermined amount of time of operating the converter using the open-loop voltage control, a switching device to thereby connect the output of the converter with the electrical grid.

16 Claims, 5 Drawing Sheets

(51) Int. Cl.
*F03D 7/02* (2006.01)
*H02J 3/38* (2006.01)
*H02J 3/42* (2006.01)
*H02H 7/26* (2006.01)
*F03D 9/25* (2016.01)
*H02H 9/00* (2006.01)
*H02H 7/085* (2006.01)

(52) U.S. Cl.
CPC ............... *H02J 3/386* (2013.01); *H02J 3/42* (2013.01); *H02H 7/085* (2013.01); *Y02E 10/72* (2013.01); *Y02E 10/763* (2013.01)

(56) References Cited

U.S. PATENT DOCUMENTS

| | | | |
|---|---|---|---|
| 2011/0106470 A1* | 5/2011 | Yin | H02J 3/01 702/58 |
| 2011/0140534 A1* | 6/2011 | Yasugi | H02J 3/005 307/80 |
| 2011/0182091 A1* | 7/2011 | Ohshima | H02J 3/42 363/49 |
| 2013/0119763 A1* | 5/2013 | Zhu | H02M 1/36 307/43 |
| 2013/0134710 A1* | 5/2013 | Yuan | H02M 1/00 290/44 |
| 2013/0182465 A1* | 7/2013 | Wang | H02J 3/386 363/34 |
| 2015/0077067 A1* | 3/2015 | Kanjiya | H02P 9/10 322/21 |
| 2015/0333501 A1* | 11/2015 | Geisler | F03D 7/0272 322/21 |
| 2016/0102653 A1* | 4/2016 | Barton | F03D 7/00 290/44 |
| 2018/0262009 A1* | 9/2018 | Sun | H02J 3/383 |

FOREIGN PATENT DOCUMENTS

| | | |
|---|---|---|
| EP | 2348628 A2 | 7/2011 |
| EP | 2416480 A2 | 2/2012 |
| EP | 2871759 A1 | 5/2015 |
| WO | 0013285 A2 | 3/2000 |
| WO | 2012000510 A1 | 1/2012 |
| WO | 2014203116 A1 | 12/2014 |
| WO | 2016206688 A1 | 12/2016 |

* cited by examiner

CONTROLLED INRUSH CURRENT FOR CONVERTER-CONNECTED GRID FILTER

BACKGROUND

Technical Field

Embodiments presented in this disclosure generally relate to wind turbines, and more specifically, to techniques for connecting wind turbine generators to the electrical grid.

Description of the Related Art

Modern power generation and distribution networks increasingly rely on renewable energy sources, such as wind turbine generators. Wind turbine generators are often connected to the electrical grid through a grid filter in order to reduce harmonics and converter switching noise that can be present in the generated power signal. The grid filters traditionally connect to the electrical grid through contactors, which are dimensioned based on the amounts of current to be supported. In some cases, large contactors may be needed to safely handle a large inrush current from the electrical grid, but these larger-sized contactors occupy a greater proportion of the limited space of the wind turbine structure. Use of large contactors may require additional power connections and components, increasing the overall system cost and complexity. Moreover, failures of the large contactors during operation may increase costs through lost production factor, increased service costs, and in some cases damage to other wind turbine components through thermal damage.

SUMMARY

One embodiment of the present disclosure is a method of connecting an output of a converter with an electrical grid to control inrush currents into a grid filter assembly connected with the output of the converter. The electrical grid carries an alternating current (AC) signal having one or more phases. The method includes determining a voltage of the AC signal and operating, after pre-charging a direct current (DC) link of the converter to a predetermined voltage, the converter using open-loop voltage control to produce an AC output signal across the grid filter assembly that substantially matches the AC signal of the electrical grid. The open-loop voltage control is based on the determined voltage of the AC signal. The method further includes closing, after a predetermined amount of time of operating the converter using the open-loop voltage control, a switching device to thereby connect the output of the converter with the electrical grid.

Another embodiment is a converter arrangement for connecting a wind turbine generator with an electrical grid carrying an alternating current (AC) signal having one or more phases. The converter arrangement includes at least a first converter including a direct current (DC) link and configured to connect with the wind turbine generator, a pre-charging circuit configured to pre-charge the DC link to a predetermined voltage, a grid filter assembly connected with an output of the first converter, and a switching means configured to selectively couple the output of the first converter with the electrical grid. The first converter is configured to produce, using open-loop voltage control based on a determined voltage of the AC signal, an AC output signal across the grid filter assembly that substantially matches the AC signal of the electrical grid. The switching means is further configured to couple the output of the first converter with the electrical grid after a first predetermined amount of time of operating the converter using the open-loop voltage control.

Another embodiment is a controller operable to connect an output of a converter with an electrical grid to control inrush currents into a grid filter assembly connected with the output of the converter. The electrical grid carries an alternating current (AC) signal having one or more phases. The controller includes a computer processor that is configured to determine a voltage of the AC signal and to operate, after pre-charging a direct current (DC) link of the converter to a predetermined voltage, the converter using open-loop voltage control to produce an AC output signal across the grid filter assembly that substantially matches the AC signal of the electrical grid. The open-loop voltage control is based on the determined voltage of the AC signal. The computer processor is further configured to operate, after a predetermined amount of time of operating the converter using the open-loop voltage control, the switching means to couple the output of the converter with the electrical grid.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION OF EMBODIMENTS

Embodiments of the disclosure are generally directed to techniques for connecting an output of a converter with an electrical grid to control inrush currents into a grid filter assembly connected with the output of the converter. Inrush currents are often proportional to a voltage difference that exists when an operational electrical grid is connected with a converter arrangement of a wind turbine the difference causes current to rush from the electrical grid into components of the converter arrangement, such as the grid filter assembly. If sufficiently large, the inrush current can damage components or reduce their operational life. Generally, techniques disclosed herein for controlling inrush currents include synchronizing the voltage across the grid filter assembly with the electrical grid voltage using open-loop voltage control prior to connecting the converter to the electrical grid. The techniques also include checking the health of various components of the grid filter assembly to assess their ability to handle inrush currents.

In some cases, reducing the amplitude of inrush currents allows for the use of smaller-dimensioned contactors—or in some cases, requires no contactors to be used at all—to connect the grid filter assembly with the converter output and with the electrical grid. Implementations that can reduce the size of contactors or altogether eliminate contactors occupy less space in a wind turbine, have lower production and maintenance costs, and/or experience fewer failures.

Figure 1:
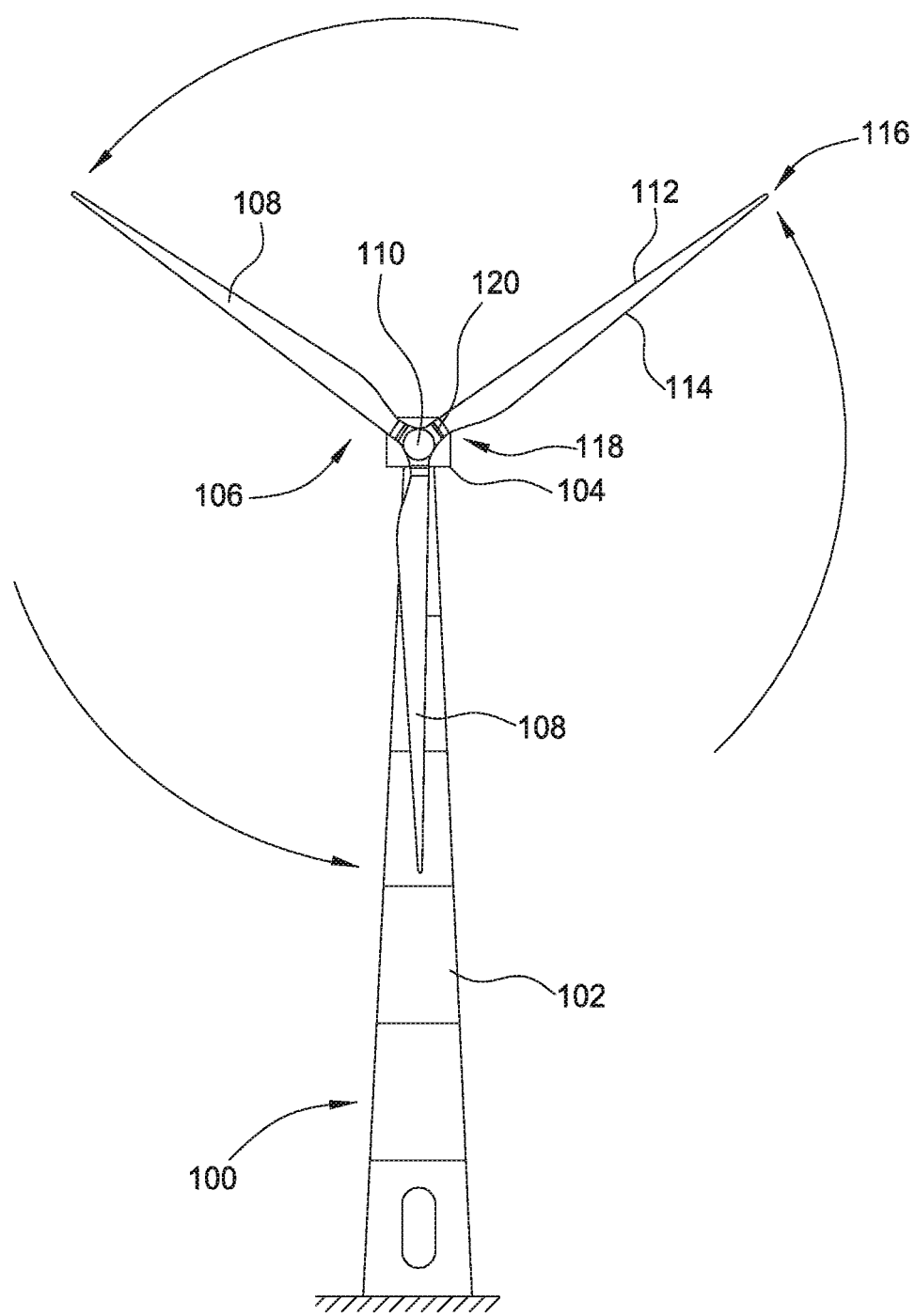
FIG. 1 illustrates a diagrammatic view of a horizontal-axis wind turbine, according to one embodiment.

FIG. 1 illustrates a diagrammatic view of a horizontal-axis wind turbine 100. The wind turbine 100 typically includes a tower 102 and a nacelle 104 located at the top of the tower 102. A wind turbine rotor 106 may be connected with the nacelle 104 through a low speed shaft extending out of the nacelle 104. As shown, the wind turbine rotor 106 includes three rotor blades 108 mounted on a common hub 110, but may include any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 may be controlled by linear actuators or stepper motors, for example, connected between the hub 110 and the blade 108. Blade pitch control may also be used among others systems to maximize the power generated below rated wind speeds and to reduce the power generated above the rated wind speed to prevent excessive loading on turbine components, e.g., the generator and gearbox. Although the following embodiments are described in the context of a wind turbine, the embodiments are not limited to such. Indeed, this disclosure may apply to any power generation system capable of connecting through a grid filter to an electrical grid.

Figure 2:
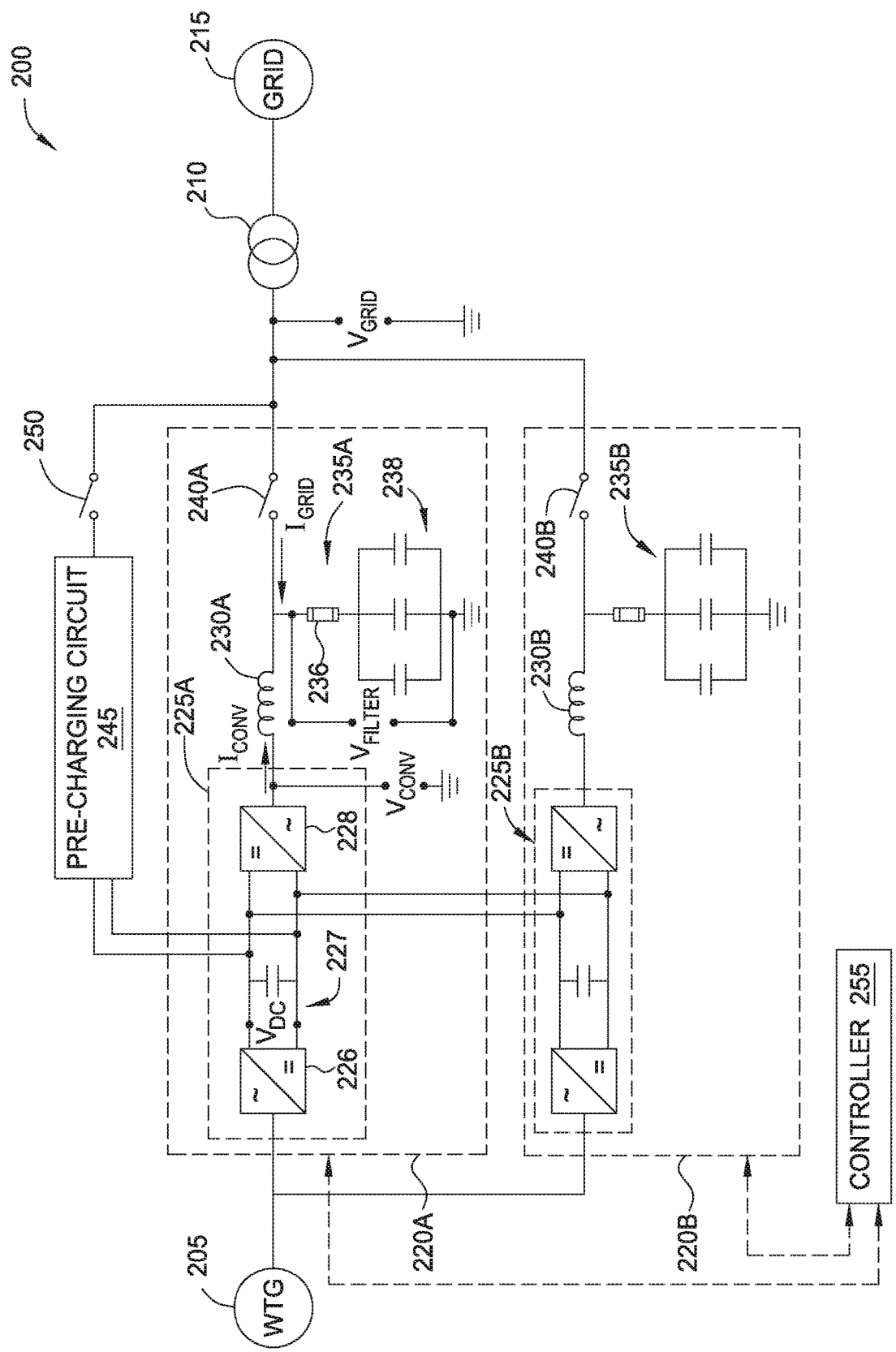
FIG. 2 illustrates a converter arrangement for connecting a wind turbine generator with an electrical grid carrying an alternating current (AC) signal having one or more phases, according to one embodiment.

FIG. 2 illustrates a converter arrangement for connecting a wind turbine generator with an electrical grid carrying an alternating current (AC) signal having one or more phases, according to one embodiment. Generally, portions of the converter arrangement 200 may be housed within the wind turbine 100.

The converter arrangement 200 includes a wind turbine generator 205 (also WTG) that may be selectively coupled and decoupled with an electrical grid 215. The wind turbine generator 205 is generally configured to generate electrical power from available wind energy (e.g., through rotational energy imparted to rotor 106). The wind turbine generator 205 is electrically connected with one or more converter branches 220A, 220B (generically or collectively, converter branch(es) 220) that are configured to adapt the characteristics of the generated power signal (e.g., voltage, current, frequency, phase) into a form more suitable for delivery to the electrical grid 215. In some embodiments, the converted power signal is passed through a transformer 210 to step up the voltage of the power signal before delivery to the electrical grid 215. In some embodiments, the WTG 205 is not configured to provide power to the electrical grid 215 at the time of connecting the converter arrangement 200 with the electrical grid. For example, the WTG 205 may be shut down and/or disconnected from the converter arrangement 200.

Each converter branch 220A, 220B includes a respective converter 225A, 225B (generically or collectively, converter(s) 225) that is configured to receive a generated power signal from the WTG 205. Although the connection between the WTG 205 and each converter 225 is depicted as a single connection for visual simplicity, embodiments of the disclosure also contemplate implementations in which two or more phases of electrical power are provided to each converter 225 using multiple connections. For example, the WTG 205 may have three connections with each converter 225, each connection carrying one of the three phases of power generated by the WTG 205. As shown, each converter 225 is an AC-DC-AC converter that includes a rectifier 226 for converting the one or more phases of the received AC signal to a DC signal, and supplying the DC signal to a DC link 227. The DC link 227 may include other circuit elements and/or connections for controlling a DC link voltage $V_{DC}$, for example a capacitor or other signal conditioning components. The converter 225 also includes an inverter 228 that is configured to convert the DC signal from the DC link 227 into a second AC signal having desired properties.

Various elements of converter 225 may be controlled by a controller 255. The controller 255 may have any suitable form, and generally includes a computer processor, memory, and input/output capabilities for receiving data and transmitting control signals to elements of the converter 225. For example, the rectifier 226 and inverter 228 may include semiconductor switches such as metal-oxide semiconductor field effect transistors (MOSFETs) or insulated-gate bipolar transistors (IGBTs), and the controller 255 may provide control signals to switch the rectifier 226 and inverter 228 to provide desired signal characteristics. For example, the controller 255 may be used to generate a pulse width modulation (PWM) output signal at the output of the converter 225.

The outputs of the converters 225 may be connected with respective inductors 230A, 230B (generically or collectively, inductor 230) or other signal conditioning elements for filtering high frequency noise such as the switching noise caused by PWM. As above, a single connection at the output of the converters 225 is shown for simplicity, and suitable implementations may include multiple connections for supporting multiple phases of the output power signal from the converter 225. Each connection may include a separate inductor 230 and/or grid filter assembly 235A, 235B (generically or collectively, grid filter assembly 235).

The grid filter assembly 235 is connected with the output of a converter 225 and provides further filtering of harmonics and converter switching noise. The grid filter assembly 235 includes a fuse 236 as well as a capacitor bank including one or more capacitors 238. As shown, the capacitors 238 are arranged in parallel and connected to ground (one example of a wye (Y) configuration); other configurations of the capacitors 238 are possible, such as a floating wye (i.e., not coupled with ground or another reference voltage) and delta (Δ) configurations. Additionally, the capacitors 238 need not be connected to ground, but in some configurations may be connected across phases of the output power signal.

In some cases, when connecting a converter 225 to the electrical grid 215, such as by closing a switching means 240A, 240B (also switching means 240), a significant inrush current flows from the electrical grid 215 into the grid filter assembly 235. The switching means 240 may be any suitable electrical or electro-mechanical switching device for selectively connecting an electrical grid with a converter, such as a switch, circuit breaker, contactor, relay, etc. While it is possible to support a large inrush current into the grid filter assembly 235 using one or more contactors having suitable dimensions, large and/or numerous contactors may be particularly costly and/or unsuitable for deployment in a wind turbine. For example, one possible implementation could include separate contactors for each of the elements of the grid filter assembly 235, and the total inrush current from the electrical grid 215 could be limited by operating the contractors to connect each of the elements in sequence. However, by synchronizing the voltage $V_{filter}$ across the grid filter assembly 235 with the electrical grid voltage $V_{grid}$ prior to closing the switching means 240 and thereby connecting the grid filter assembly 235 with the electrical grid 215, the amount of inrush current may be limited to acceptable levels for the components of the grid filter assembly 235. In some embodiments, the grid filter assembly 235 can be connected with the output of the converter 225 directly—i.e., without using a switching element such as a contactor. Alternatively, using synchronization techniques, the grid filter assembly 235 could be connected through a smaller contactor that is not rated for the full amount of inrush current possible from the electrical grid.

In some embodiments, the synchronization is performed using an open-loop voltage control based on a determined voltage of the electrical grid. For example, a measured amplitude and a determined phase angle of the electrical grid (e.g., using a phase-locked loop component of the controller 255) serve as a reference for the voltage at the output of converter 225 and/or the voltage across the grid filter assembly 235. In some embodiments, the amplitude of the output voltage from converter 225 is increased gradually according to a selected ramping factor. The ramping factor may be selected based on a predetermined amount of time for the output voltage to reach its target voltage (that is, substantially synchronized with the grid voltage). In some embodiments, the ramping factor is selected such that a multiplicative product of the ramping factor and time saturates at the predetermined amount of time.

Controller 255 may also control the operation of a pre-charging circuit 245 connected to the DC link 227. The pre-charging circuit 245 may have any suitable configuration capable of pre-charging the DC link 227 to a desired voltage $V_{DC}$, including active and/or passive electrical components. For example, the pre-charging circuit 245 could include a DC power source, and/or a rectifier to convert an AC power source to DC. In some embodiments, the controller 255 operates a switch 250 to selectively connect the pre-charging circuit 245 to receive power from the electrical grid 215. Additionally or alternatively, the controller 255 signals logic included in the pre-charging circuit 245 to start or stop generating an output to pre-charge the DC link 227. In one embodiment, a pre-charging circuit 245 corresponds to a converter 225 in a 1:1 ratio. In another embodiment—and as shown—a single pre-charging circuit 245 corresponds to two or more converters 225.

Controller 255 may receive data from one or more sensors connected at various points throughout the converter arrangement 200. For example, multiple current and voltage sensors may be used to determine DC link voltage $V_{DC}$, converter output voltage $V_{conv}$ and current $I_{conv}$, grid filter assembly voltage $V_{filter}$, grid voltage $V_{grid}$ and grid current $I_{grid}$, and so forth. In some embodiments, controller 255 may use the measured currents and/or voltages to control the output of converter 225. As discussed above, the controller 255 may include phase-locked loop (PLL) logic that operates to synchronize the frequency and phase of the converter output voltage $V_{conv}$ (as well as filter voltage $V_{filter}$) with the electrical grid voltage $V_{grid}$. The controller 255 may also include control loop logic to synchronize the amplitude of $V_{conv}$ with $V_{grid}$.

Although two converter branches 220 are depicted, any suitable number of converter branches are possible. Other examples include one branch, three, or four or more branches. In some cases, the number of converter branches 220 may be determined by the rated power of the wind turbine generator 205. In some embodiments, multiple converter branches 220 may connect to the electrical grid 215 through a single switching means 240. In some embodiments, separate switching means 240 are provided for each of the converter branches 220. In some cases, the amount of power drawn from the pre-charging circuit 245 for pre-charging the DC links 227 of each converter branch 220 could be reduced by charging each of DC links 227 sequentially and connecting the converter branches 220 through separate switching means 240.

Figure 3:
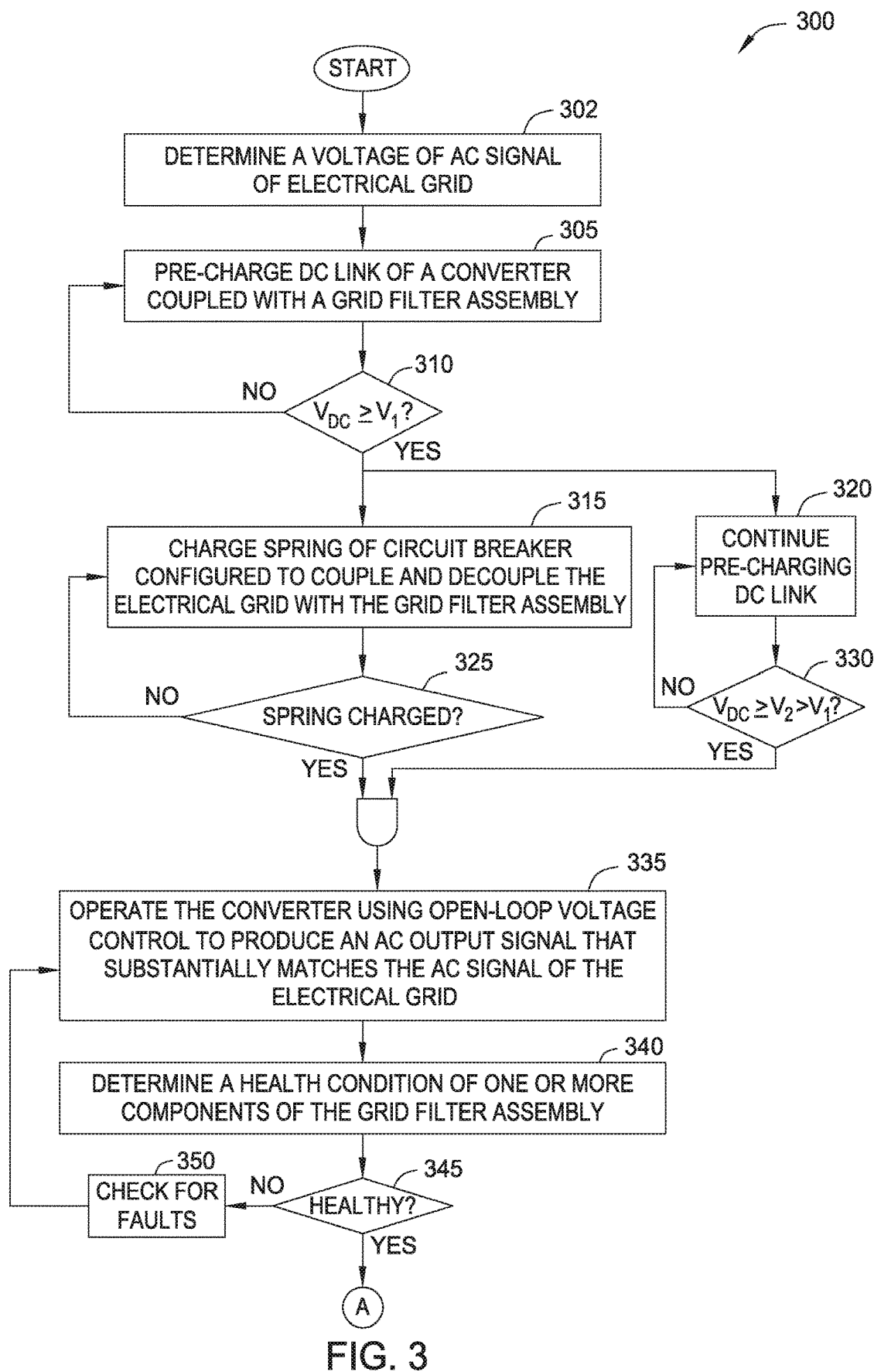
FIG. 3 illustrates a method of connecting an output of a converter with an electrical grid to control inrush currents into a grid filter assembly connected with the output of the converter, according to one embodiment.
Figure 3:
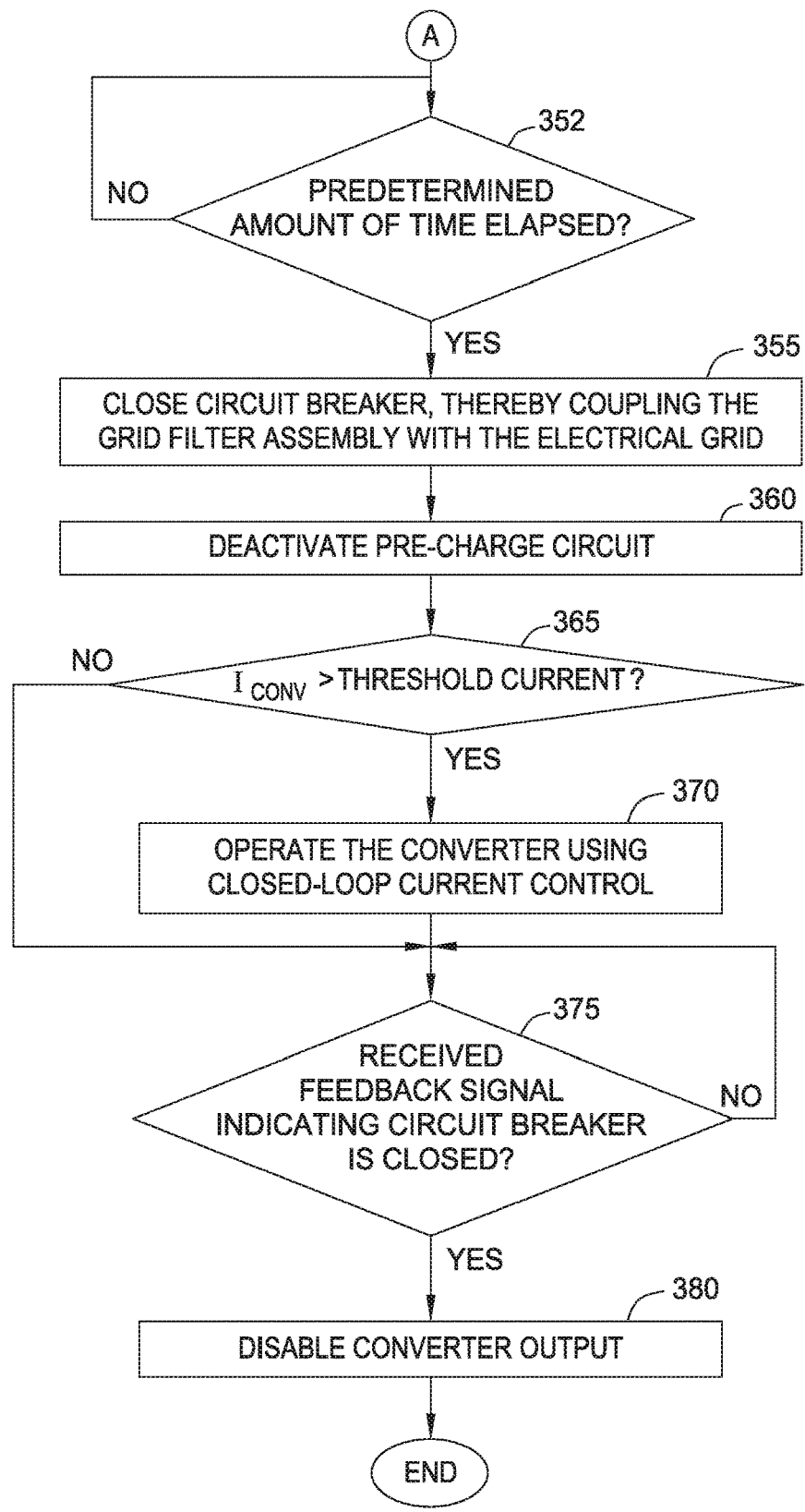

FIG. 3 illustrates a method of connecting an output of a converter with an electrical grid to control inrush currents into a grid filter assembly connected with the output of the converter, according to one embodiment. Method 300 may generally be used by the controller 255 of the converter arrangement 200.

Method 300 begins at block 302, where the controller determines a voltage of an AC signal of the electrical grid. For example, the controller can receive measurements from one or more sensors to determine the voltage of the AC signal. At block 305, the controller causes a DC link of the converter to be pre-charged. In some embodiments, the controller is an AC-DC-AC converter including a rectifier and an inverter that are connected via the DC link. An output of the converter is also coupled with a grid filter assembly. In some embodiments, the grid filter assembly is connected to the converter output without the use of a contactor or other controller-operable switching mechanism. In some embodiments, the controller causes the DC link to be pre-charged by enabling a pre-charging circuit. For example, the controller may operate a switch to physically couple the pre-charging circuit to a power supply, such as the electrical grid. In another example, the power supply may be connected to the pre-charging circuit, and the controller may signal to logic of the pre-charging circuit to begin generating an output. In some embodiments, the controller is further configured to control or specify parameters related to pre-charging the DC link, such as a desired voltage level, an amount of time within which to complete the pre-charging, a rate of pre-charging, and so forth.

At block 310 the controller determines whether a voltage $V_{DC}$ across the DC link meets a first threshold voltage $V_1$. For example, the controller may acquire data from a voltage sensor at the DC link. In some embodiments, the value of $V_1$ is selected to test the functionality of the pre-charge circuit. For example, the DC link reaching the first threshold voltage $V_1$ can indicate that no short circuits are present in the DC link or the pre-charge circuit. In some cases, the value of $V_1$ may be about 100 V or less.

If $V_{DC}$ has not yet reached the $V_1$ value ("NO"), the method returns to block 305 to continue pre-charging. If $V_{DC}$ meets the $V_1$ value ("YES"), the method proceeds to blocks 315 and 320. While shown as occurring contemporaneously, in other embodiments blocks 315 and 320 may be performed sequentially. At block 320, the pre-charging of the DC link continues until it is determined in block 330 that the voltage $V_{DC}$ meets a second threshold voltage $V_2$ ("YES"). The second threshold voltage $V_2$ is generally a greater value than the first threshold voltage $V_1$, and can be selected based on requirements for charging a switching device (e.g., a circuit breaker spring) used to connect the grid filter assembly with the electrical grid. In some embodiments, the value of $V_2$ may is selected to be sufficiently large such that pulse width modulation (PWM) may be enabled at the converter output without discharging the DC link.

At block 315, the controller causes the charging of the spring of a circuit breaker that is operable to couple and decouple the grid filter assembly with the electrical grid. In other embodiments, any alternative suitable switching device may be substituted for the circuit breaker. As it is possible that an alternative switching device might not use a charged spring to operate, in some cases block 315 may be omitted or the controller may direct an alternative enabling function such as energizing the switching device.

At block 325, if the spring is not yet adequately charged to operate the circuit breaker ("NO"), the method returns to block 315 to continue the charging. For the case of an alternative switching device, block 325 may be used to determine whether the alternative switching device is ready to be operated. If the spring is adequately charged to operate the circuit breaker ("YES"), the method proceeds to block 335 when both the spring is adequately charged and DC link voltage $V_{DC}$ meets a second threshold voltage $V_2$.

At block 335, the controller operates the converter using open-loop voltage control to produce an AC output signal across the grid filter assembly that substantially matches the AC signal of the electrical grid. In some embodiments, the controller enables PWM by the inverter component of the converter, and the switching control signals are determined to synchronize the voltage across the grid filter assembly ($V_{filter}$) with the voltage of the electrical grid $V_{grid}$. The open-loop voltage control is based on $V_{grid}$. In some embodiments, synchronizing includes matching one or more of the amplitude, frequency, and phase of the voltage $V_{grid}$. In one embodiment, the frequency and phase of $V_{grid}$ are matched relatively quickly through use of a phase-locked loop (PLL) while the amplitude of $V_{grid}$ is matched gradually. In one embodiment, the amplitude at the converter output is increased according to:

$$V_{conv} = k \times t \times |V_{grid,PLL}| + (j\omega L \times I_{conv}) \quad (1)$$

where $V_{conv}$ represents the voltage produced at the converter output, k represents a ramping factor, t represents time, $V_{grid,PLL}$ represents the grid voltage as determined by the PLL, and $(j\omega L \times I_{conv})$ represents the voltage drop across the inductor (e.g., inductor 230A). The corresponding value of $V_{filter}$ may thus be represented as:

$$V_{filter} = V_{conv} - (j\omega L \times I_{conv}) = k \times t \times |V_{grid,PLL}| \quad (2)$$

In some embodiments, the value of ramping factor k is selected based on a desired rate for increasing the current through the grid filter assembly. For example, the rate may be relatively fast in order to avoid discharging the DC link through PWM losses in the converter. In one embodiment, the multiplicative product (i.e., k×t) saturates at a value of one (1), so that $V_{filter}$ matches $V_{grid}$ after a predetermined amount of time.

The AC output signal across the grid filter assembly (i.e., corresponding to $V_{filter}$) that is produced by the converter "substantially matches" the AC signal of the electrical grid when any difference between the signals' characteristics (e.g., amplitude, frequency, phase) corresponds to an acceptably small inrush current into the grid filter assembly upon connecting the converter to the electrical grid (block 355, below). In one example, the AC output signal is approximately identical to the AC signal of the electrical grid, which may correspond to an insubstantial amount of inrush current when connecting the converter to the electrical grid. In another example, the AC output signal differs in one or more of the amplitude, frequency, and phase, and the controller determines that the corresponding amount of inrush current when connecting the converter can be tolerated by the components of the grid filter assembly. In one embodiment, the controller may calculate an expected amount of inrush current based on the differences between the AC output signal and AC signal of the electrical grid, and compare the calculated amount of inrush current against a threshold value. In some cases, the threshold value can be varied over the life of the grid filter assembly components to reflect wear caused by earlier operation of the grid filter assembly, such as previous inrush currents.

At block 340, the controller determines a health condition of one or more components of the grid filter assembly. The components of the grid filter assembly may include one or more fuses connected with one or more capacitors in any suitable arrangement. The health of the grid filter assembly components may be important to assess the components' ability to withstand an inrush current when the converter is connected with the electrical grid. Block 340 may occur after a predetermined amount of time elapses for operating the converter with open-loop voltage control. The predetermined amount of time may correspond to sufficient time for $V_{filter}$ to match $V_{grid}$, so that the health of the components may be determined at or close to normal operating conditions. In some embodiments, determining a health condition of components includes measuring an amount of current flowing through the components and/or through the grid filter assembly as a whole, and determining whether the measured amount corresponds to a normal operating condition. For example, if the controller determines that no current flows through a particular capacitor, the controller may deem that the capacitor is not healthy (e.g., perhaps shorted, damaged, or disconnected). In another example, the expected amount of current flowing through a capacitor is within a range of a nominal amount, such as ±10% of a nominal current that is proportional to the voltage applied to the capacitor. The nominal current may correspond to the current expected when the capacitor bank is in a charged state. When the measured current for a capacitor falls outside the range, the capacitor is deemed not healthy.

In some embodiments, determining a health condition of components may include determining an amount of reactive power generated or consumed by particular components and/or the grid filter assembly. Generally, determining the amount of reactive power may be based on the determined amount of current through the components and/or the grid filter assembly. When the amount of reactive power falls outside an expected range, the component may be deemed not healthy.

If any of the grid filter assembly components are not healthy ("NO") at block 345, the method proceeds to block 350 and the controller checks for faults in the grid filter assembly. In some cases, the controller may signal to an operator that a physical inspection of the components is required, and may also shut down the converter. However, if the grid filter assembly components are healthy ("YES") at block 345, the method proceeds to block 352 where the controller determines whether a predetermined amount of time has elapsed. In some cases, the predetermined amount of time can be the same as discussed at block 340, above.

In other cases, the predetermined amount of time follows the predetermined amount of time discussed at block 340. If the predetermined amount of time has elapsed ("YES"), the method proceeds to block 355, and the controller closes the circuit breaker, thereby coupling the converter—and the grid filter assembly—with the electrical grid. At this point, current from the electrical grid begins to flow into the grid filter assembly.

At block 360, the controller deactivates the pre-charge circuit. Block 360 may include the reverse of certain steps taken at block 305, such as disconnecting the power supply from the pre-charging circuit, or signaling to the pre-charging circuit to cease generating an output. In some embodiments, deactivating the pre-charging circuit can occur at an earlier point in the method 300, such as prior to producing the matching AC output signal at block 335.

At block 365, the controller determines whether an amount of current from the converter ($I_{conv}$) is greater than a threshold amount. Typically, $I_{conv}$ exceeding a threshold amount is indicative that the grid voltage $V_{grid}$ and filter voltage $V_{filter}$ were not adequately synchronized when the circuit breaker was closed. With the pre-charge circuit deactivated (e.g., at block 360 or earlier), too large a value of $I_{conv}$ can cause the DC link to discharge. When $I_{conv}$ exceeds the threshold value, the method proceeds to block 370. At block 370, the controller is transitioned from the open-loop voltage control to operate in a closed-loop current control scheme in order to suppress or otherwise reduce the $I_{conv}$ value to further transition the grid filter assembly to receiving its current from the electrical grid. At block 375, when a feedback signal has been received indicating that the circuit breaker is closed, the method proceeds to block 380 and disables the converter output. However, if the feedback signal has not yet been received, the method returns to block 375. Method 300 ends following completion of block 380.

Figure 4:
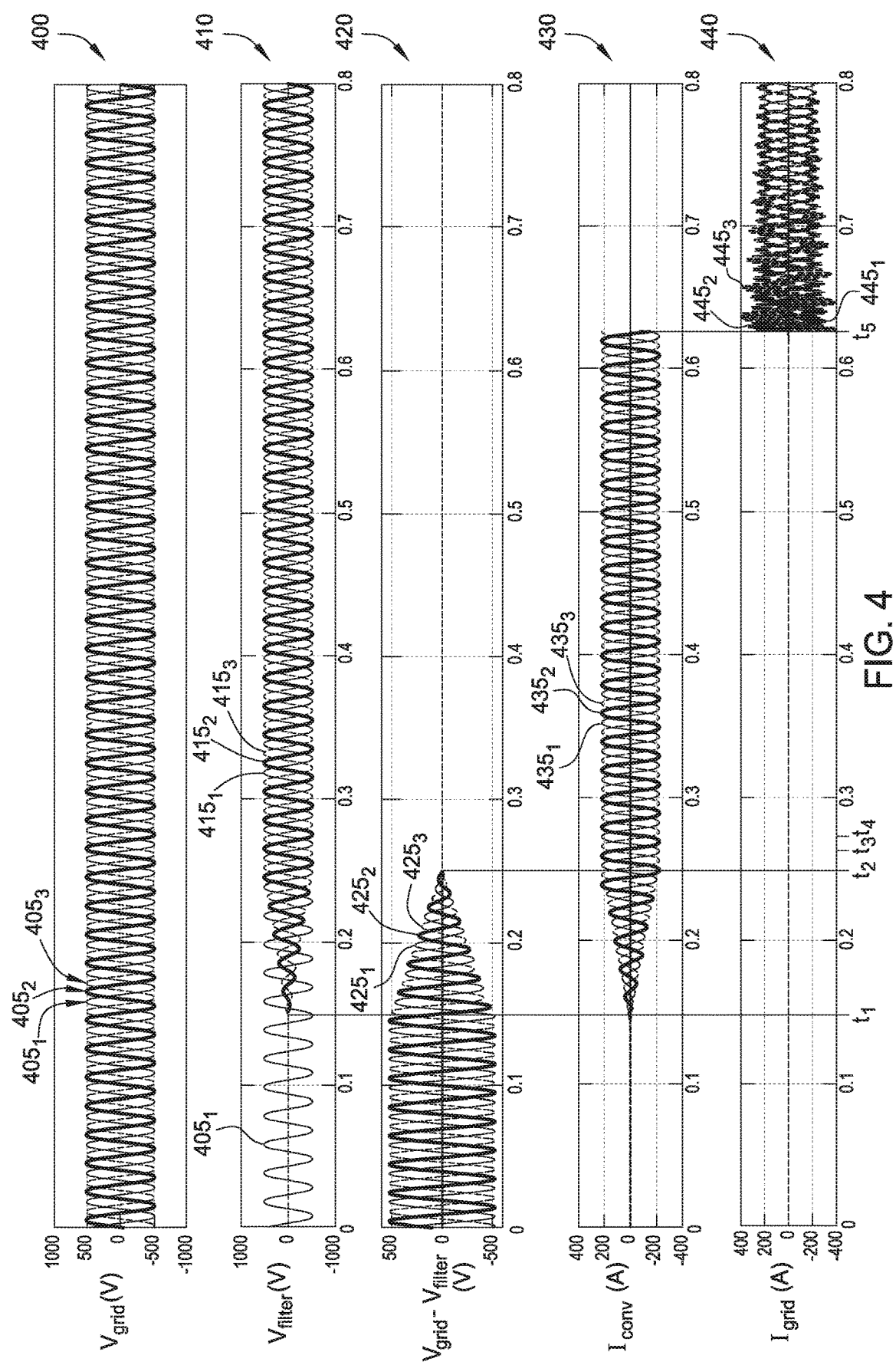
FIG. 4 includes several plots illustrating an exemplary connection of an output of a converter with an electrical grid to control inrush currents into a grid filter assembly connected with the output of the converter, according to one embodiment.

FIG. 4 includes several plots illustrating an exemplary connection of an output of a converter with an electrical grid to control inrush currents into a grid filter assembly connected with the output of the converter, according to one embodiment. Plot 400 illustrates grid voltage $V_{grid}$ in volts (V) versus time in seconds (s). Included in plot 400 are phase signals $405_1$, $405_2$, $405_3$ that each represent one of the three phases of the signal carried by the electrical grid. Other embodiments may include greater or lesser numbers of phases. As shown, $V_{grid}$ has a peak-to-peak value of about 1000 V, and a frequency of about 50 hertz (Hz). While it is possible that the characteristics of $V_{grid}$ may change relative to time (e.g., based on connected generators and electrical loads and other grid conditions), $V_{grid}$ is depicted as being stable across the time window for ease of description.

Plot 410 illustrates the three phases $415_1$, $415_2$, $415_3$ of filter voltage $V_{filter}$ in V, as well as one phase signal $405_1$ of the electrical grid for visual reference. The voltage difference between $V_{grid}$ and $V_{filter}$ is illustrated in plot 420 as three phase signals $425_1$, $425_2$, $425_3$ (collectively, 425). For the time period (t=0:$t_1$) $V_{filter}$ is approximately zero, so that the voltage difference approximately equals the full amount of $V_{grid}$. Were the circuit breaker closed during this period, connecting the electrical grid with the converter output and grid filter assembly without performing synchronization, the amount of inrush current into the grid filter assembly may exceed acceptable tolerances for the assembly's components, such as a fuse and/or capacitors. For the peak-to-peak value of $V_{grid}$ depicted (approximately 1000 V, corresponding to ±500V), simulations have shown an inrush current on the order of ±2000 A or 2 kiloamps (kA) (a peak-to-peak value of about 4 kA) which tapers off to a steady-state grid current of about ±200 A. In such a case, the inrush current is approximately ten (10) times greater than the steady-state grid current.

Plot 430 illustrates the three phases $435_1$, $435_2$, $435_3$ of current output $I_{conv}$ from the converter in amperes (amps or A). At time $t_1$, the controller causes the converter to begin producing an AC output signal. It may be presumed that the DC link of the converter is pre-charged and/or the spring of the circuit breaker is charged at time $t_1$. The AC output signal from the converter increases in amplitude between time $t_1$ and time $t_2$, which can be seen in plot 430. Accordingly, the amplitude of $V_{filter}$ (plot 410) increases with the increased converter current $I_{conv}$ during this time period. The amplitude increases based on a selected ramping factor k, and the product (k×t) may saturate at a value of one for values of t greater than $t_2$ (relative to a starting time $t_1$).

During the period between $t_1$ and $t_2$, the voltage difference in plot 420 decreases as $V_{filter}$ increases. The fact that the phase signals 425 appear relatively well-defined in the time dimension generally indicates that $V_{filter}$ is synchronized in frequency and phase with $V_{grid}$. The non-zero amplitude of the voltage difference indicates that $V_{grid}$ remains larger than $V_{filter}$, until reaching time $t_2$. At time $t_2$, the filter voltage $V_{filter}$ is synchronized with the grid voltage $V_{grid}$, which can significantly reduce the amount of inrush current into the grid filter assembly compared with before time $t_1$.

At time $t_3$ following $t_2$, the controller may determine a health condition of the grid filter assembly components. While it is possible to determine a health condition during the charging of the grid filter assembly (e.g., between times $t_1$, $t_2$), in some cases the values that are used to assess whether a component is healthy (e.g., nominal current or reactive power values) may be referenced to the amplitude of $V_{grid}$. Thus, in some embodiments, determining a health condition may be performed after the filter voltage has reached the level of $V_{grid}$.

Assuming that all grid filter assembly components are healthy, the controller closes the circuit breaker at time $t_4$. Closing the circuit breaker and sensing the feedback generally requires a finite, non-zero amount of time. Plot 440 illustrates grid current $I_{grid}$ that flows into the grid filter assembly, which is first sensed at time $t_5$. The three phases $445_1$, $445_2$, $445_3$ of $I_{grid}$ show an inrush current less than about ±400 A, tapering off to a steady-state grid current of about ±200 A. Thus, performing a synchronization of the filter voltage in this case reduced the inrush current to about one-fifth the amount of the unsynchronized inrush current (i.e., about ±2000 A). Importantly, the inrush current can be controlled within a normal operating range for the grid filter assembly using the synchronization techniques described herein.

Closing the circuit breaker begins the transition of supporting the filter voltage $V_{filter}$ using converter current $I_{conv}$ to using grid current $I_{grid}$. After closing the circuit breaker, if $I_{conv}$ still has a substantial amplitude (e.g., greater than a predetermined threshold amount), this may suggest that $V_{filter}$ was not adequately synchronized with $V_{grid}$ at the time of closing the circuit breaker. The controller may enter a closed-loop current control to reduce $I_{conv}$ to zero, and thus fully transitioning to using grid current $I_{grid}$. If $I_{conv}$ is sufficiently small after closing the circuit breaker (e.g., between zero and the threshold amount), the controller can await receipt of a feedback signal indicating that the circuit breaker has been closed. Upon receiving the signal, the controller may disable the converter output. In some cases, having the filter voltage $V_{filter}$ synchronized with the grid voltage $V_{grid}$ allows for a relatively rapid transition for the WTG and converter to subsequently begin providing wind-based power to the electrical grid (e.g., within a few seconds, such as within two seconds). Further, when the converter's PWM output is subsequently activated, the synchronized voltage ensures that the grid filter assembly can be transitioned to receive $I_{conv}$ in a controlled manner.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method of connecting a converter output of a converter with an electrical grid to control inrush currents into a grid filter assembly connected with the converter output, the electrical grid carrying alternating current (AC) power having one or more phases, the method comprising:
pre-charging a direct current (DC) link of the converter to a predetermined voltage;
responsive to a voltage of the DC link reaching a first threshold voltage less than the predetermined voltage, enabling a switching device that is operable to connect the converter output with the electrical grid, wherein enabling the switching device comprises one of charging and energizing the switching device;
operating, responsive to determining that the switching device is enabled and that the DC link is charged to the predetermined voltage, the converter using open-loop voltage control to produce an AC output across the grid filter assembly that substantially matches the AC power of the electrical grid, the open-loop voltage control based on a determined voltage of the AC power; and
closing, after a first predetermined amount of time of operating the converter using the open-loop voltage control, the switching device to thereby connect the converter output with the electrical grid.

2. The method of claim 1, wherein an amplitude of the AC output is gradually increased to match the AC power of the electrical grid.

3. The method of claim 1, further comprising:
determining, based on the AC output, a health condition of one or more components of the grid filter assembly,
wherein closing the switching device is performed after determining that the one or more components are healthy.

4. The method of claim 3, wherein determining the health condition of the one or more components is performed after a second predetermined amount of time of operating the converter using the open-loop voltage control, the second predetermined amount of time less than the first predetermined amount of time.

5. The method of claim 1, wherein determining the health condition of the one or more components of the grid filter assembly includes determining an amount of current flowing through the one or more components.

6. The method of claim 5, wherein determining the health condition of the one or more components of the grid filter assembly includes determining an amount of reactive power corresponding to the one or more components based on the determined amount of current.

7. The method of claim 1, further comprising:
determining, after closing the switching device, that an amount of current output by the converter exceeds a threshold current;
operating the converter using closed-loop current control; and
disabling the converter output upon receiving a feedback signal indicating that the switching device is closed.

8. A converter arrangement for connecting a wind turbine generator with an electrical grid carrying alternating current (AC) power having one or more phases, the converter arrangement comprising:
at least a first converter including a direct current (DC) link and configured to:
connect with the wind turbine generator; and
produce, using open-loop voltage control based on a determined voltage of the AC power, an AC output that substantially matches the AC power of the electrical grid;
a pre-charging circuit configured to pre-charge the DC link to a predetermined voltage; and
a first switching means configured to:
enable responsive to a voltage of the DC link reaching a first threshold voltage less than the predetermined voltage, wherein enabling comprises one of charging and energizing the first switching means; and
once enabled, couple the AC output of the first converter with the electrical grid after a first predetermined amount of time of operating the first converter using the open-loop voltage control.

9. A controller comprising:
a computer processor configured to:
determine a voltage of AC power carried by an electrical grid;
operate a pre-charging circuit to pre-charge a direct current (DC) link of a converter to a predetermined voltage;
responsive to a voltage of the DC link reaching a first threshold voltage less than the predetermined voltage, enable a switching device that is operable to connect an output of the converter with the electrical grid;
operate, responsive to determining that the switching device is enabled and that the DC link is charged to the predetermined voltage, the converter using open-loop voltage control to produce an AC output that substantially matches the AC power of the electrical grid, the open-loop voltage control based on the determined voltage of the AC power; and
operate, after a first predetermined amount of time of operating the converter using the open-loop voltage control, the switching device to couple the output of the converter with the electrical grid.

10. The controller of claim 9, wherein the computer processor is further configured to:
determine, based on the AC output, a health condition of one or more components of a grid filter assembly connected with the output of the converter,
wherein operating the switching device is performed after determining that the one or more components are healthy.

11. The controller of claim 9, wherein the computer processor is further configured to:
determine, after operating the switching device, that an amount of current output by the converter exceeds a threshold current;
operate the converter using closed-loop current control; and
disable the output of the converter upon receiving a feedback signal indicating that the switching device is closed.

12. The converter arrangement of claim 8, further comprising:

a grid filter assembly connected with an output of the first converter.

13. The converter arrangement of claim 12, wherein the grid filter assembly includes a fuse in series with a capacitor bank having one or more capacitors.

14. The converter arrangement of claim 12, further comprising:
- a second converter including a respective DC link and configured to connect with the wind turbine generator in parallel with the first converter;
- a second grid filter assembly connected with an output of the second converter; and
- a second switching means configured to selectively couple the output of the second converter with the electrical grid,
- wherein the pre-charging circuit is connected with the DC links of the first and second converters.

15. The converter arrangement of claim 14, wherein the first switching means and the second switching means are different switching means.

16. The controller of claim 9, wherein enabling the switching device comprises causing one of charging and energizing the switching device.

* * * * *